(No Model.)
J. E. WILES.
ELECTROTHERAPEUTIC APPLIANCE.
No. 544,552. Patented Aug. 13, 1895.
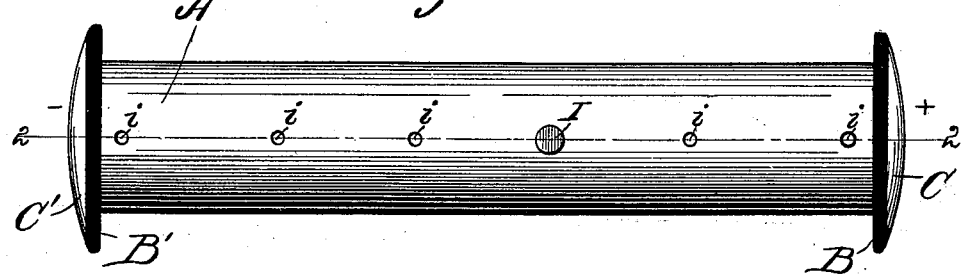
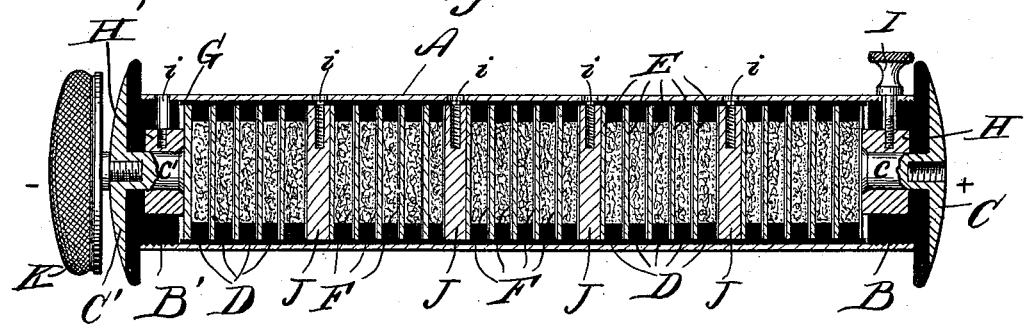
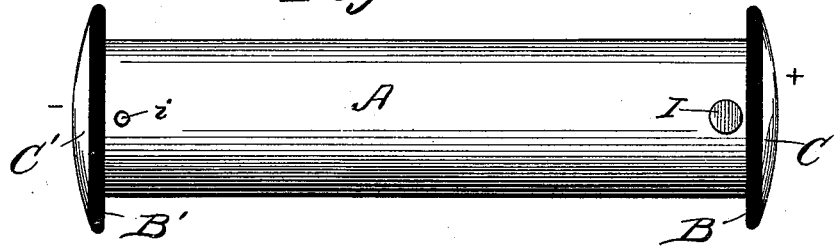
WITNESSES,
D. E. Seaman.
M. M. Wiles.
INVENTOR,
John E. Wiles.

UNITED STATES PATENT OFFICE.

JOHN E. WILES, OF MILWAUKEE, WISCONSIN.

ELECTROTHERAPEUTIC APPLIANCE.

SPECIFICATION forming part of Letters Patent No. 544,552, dated August 13, 1895.

Application filed January 14, 1895. Serial No. 534,784. (No model.)

*To all whom it may concern:*

Be it known that I, JOHN E. WILES, a citizen of the United States, residing at Milwaukee, county of Milwaukee, State of Wisconsin, have invented a certain new and useful Improvement in Electrotherapeutic Appliances; and I declare the following to be a full, clear, and exact description of the invention, such as will enable others skilled in the art to which it pertains to make and use the same, reference being had to the accompanying drawings, which form a part of this specification.

My invention relates to new and useful improvements in electrotherapeutic appliances; and it consists in the matters hereinafter described and pointed out in the appended claims.

In the accompanying drawings, illustrating my invention, Figure 1 is a side elevation of my improved device. Fig. 2 is a central vertical sectional view of the same taken on line 2 2 of Fig. 1. Fig. 3 is a side elevation of a somewhat different form of my improved device.

Referring by letter to said drawings, A designates a suitable containing-vessel, which is conveniently made of tubular form, but which may be of any desired or convenient construction, said containing-vessel being preferably made of metallic tubing, in the manner shown. Into opposite ends of said containing-vessel A are inserted suitable buttons B B', of insulating material, which may, if desired, have a screw-threaded engagement with the interior of the ends of the tubular containing-vessel A. To the outer faces of these insulating buttons are secured suitable metallic disks C C' to serve as electrodes for the application of electrical currents to the body, as will be presently described.

Within the tube A, I arrange a suitable number of galvanic cells, the same being conveniently constructed and arranged, substantially as shown in the drawings, and the containing-vessels of the individual cells comprising rings D D of insulating material, such as hard rubber or the like, for holding the excitant, and suitable electrodes E E and F F placed upon opposite sides of said rings and in contact with the excitant contained therein.

In practice I find it convenient to make the electrodes E E from disks of zinc and the electrodes F F from disks of silver.

In arranging the cells within the tubular casing A, I place them in the order of a simple series—that is to say, with the zinc electrodes of all of the cells arranged in the same order, and the zinc electrode of each cell having electrical connection with the silver electrode of the next adjacent cell. The entire series of cells is suitably inclosed within a tube G, of insulating material, so as to prevent metallic contact between the electrodes and the tubular containing-vessel A. It follows from this construction that in order to obtain a current from the galvanic cells contained within the tube A it is necessary to establish electrical connections between the electrodes of said cells and the external metallic portions of the device. To this end I provide upon the disks C C' suitable inwardly-extending connecting-pins *c* and *c'*, respectively, which are conveniently arranged to terminate, as shown more particularly in Fig. 2, in contact-buttons H and H', respectively, adapted for metallic contact with the electrodes at opposite ends of the series of cells. It follows from this construction that by placing the disks or electrodes C C' in contact with the body a current having the electromotive force of the entire series of cells may be caused to pass through the body from pole to pole of the series of cells.

As a matter of convenience, to enable the user to readily apply to any part of the body either the positive or the negative terminal of the series, as may be desirable, I prefer to provide a suitable connecting device—such, for instance, as the screw I—adapted to electrically connect the handle or tube A with a desired terminal of the series of cells, leaving the other terminal insulated from said handle or tube A. For this purpose screw-threaded holes or passages *i i* are made to extend from the outside of the handle or tube A into the contact-buttons H H', in the manner shown. It follows from this construction that the screw I being inserted into the passage or opening at one end of the series, so as to form an electrical connection between the handle or tube A and the contact-button H or H', as the case may be, will enable the user, by grasping the handle or tube A, to thus place his hand in electrical connection with one terminal of the series of cells. Then, by applying the disk or electrode C or C', which is not electrically connected with the handle or tube A to the body, the circuit may be established through the body, so as to cause the current to pass in either direction therethrough, according to whether the positive or the negative electrode be thus applied.

In the particular arrangement shown in Fig. 2 of the drawings the handle or tube A is shown to be electrically connected with the button H, which in this instance is at the positive pole or terminal of the series of cells. This enables the user to grasp the handle or tube A and apply the negative pole or electrode C' to the body. In order to enable the user to apply the positive electrode or terminal to the body it will of course be only necessary to remove the screw I from contact with the button H, and to similarly insert it in the screw-threaded opening or passage at the other end of the tube or handle A, to establish electrical contact between the latter and the contact-button H'. By this construction and arrangement of the series of cells, the metallic handle or tube, and the insulated electrodes at opposite ends thereof, the user is enabled to apply either pole or terminal of the series of cells to any desired part of the body, as may be desired, to obtain either a counter-irritant or stimulating current by the application of the negative electrode, or a sedative current by the application of the positive electrode to the part to be treated.

As a separate and further improvement, I prefer to provide suitable means for graduating the current, so as to obtain a current of any desired strength, it being, of course, desirable in the treatment of some diseases to apply very mild and weak currents, while for the stimulation of the nerves or muscles it is often necessary to apply currents of very considerable strength. For this purpose I find it convenient to provide suitable means for establishing electrical connection between the handle or tube A and any desired one of the galvanic cells contained therein, so as to enable either electrode C or C' to be applied to the body and only the current of the particular cells lying between said connection and the electrode which is applied to the body obtained. To this end I provide at suitable intervals electrodes or disks of sufficient thickness to enable them to be drilled and tapped for the reception of the contact-screw I, and these disks may be either the zinc electrodes of the cells themselves or they may be disks J J of metal interposed between the cells in the manner shown in Fig. 2 of the drawings and provided with screw-threaded passages or openings $i\ i$ for the reception of the screw I, said passages being arranged to register with similarly-arranged passages or apertures in the handle or tube A in an obvious manner. By this construction I am enabled to provide suitable means for electrically connecting the handle or tube A with any desired one of the cells of the battery, and thereby to obtain a current of any desired strength by the application of the proper electrode or terminal to the part of the body to be treated.

If desired, instead of applying the electrode C or C' directly to the body, any desired means may be employed for removably connecting suitably-shaped electrodes with the terminals C C' as may be desirable or convenient for the application of the electric current to any portion of the body to be treated. For this purpose I find it convenient to provide screw-threaded apertures in the electrodes or terminals C C' for the reception of screw-threaded shanks of any desired form of electrodes constructed with special view to their application to particular parts of the body. The particular electrode K (shown in Fig. 2 of the drawings) is constructed with a soft pad of suitable absorbent material adapted to be saturated with a liquid and to be applied to the part of the body under treatment.

In case it is desirable to apply the current to a part of the body which cannot be conveniently reached by the user, the current may be applied by another person holding the tube or handle in his hand by applying the desired electrode to the part of the patient's body to be treated and bringing his other hand into contact with any other desired part of the patient's body. In this manner a physician may readily apply the device to his patient in such a manner as to obtain the desired effect by the passage of the current in the proper direction from one point to another of the patient's body.

By my improvement I am enabled to provide an electrotherapeutic appliance of such construction as to require no attention whatever to keep it in order, and in which no adjustments of the parts are necessary, excepting to produce the described modifications of the current, while by the inclosure of the series of cells within the tubular handle or casing said cells are preserved from injury from external causes, and the evaporation of the excitant is prevented.

In practice I may employ any desired type of battery-cell; but I find that cells composed of zinc and silver electrodes, with an interposed excitant, such as ammonium chloride, and a suitable depolarizer, such as silver chloride, is very desirable.

In constructing my improved device the sizes of the individual cells may be made such as to enable me to obtain a current of any desired quantity, while in order to obtain a desired maximum of voltage or electromotive force any desired number of said cells may be arranged in the series. Furthermore, in order to enable any desired graduation of the current to be made, I may arrange the cells in groups of any desired number of cells each, so that by the adjustment of the connecting-screw in the manner described any desired variations in the strength of the current may be obtained.

Having thus described my invention, what I claim as new, and desire to secure by Letters Patent of the United States, is—

1. An electro therapeutic appliance comprising a tubular metallic handle or casing, a series of galvanic cells located therein, but insulated therefrom, contact disks or electrodes secured to opposite ends of said handle or casing but normally insulated therefrom, and having electrical connections with opposite terminals of the series of cells, and a suitable connecting device for electrically connecting either terminal of said series of cells with said handle or casing, substantially as described.

2. An electro-therapeutic appliance comprising a metallic tubular handle or casing, a series of galvanic cells contained therein, but insulated therefrom, suitable contact disks or electrodes secured to opposite ends of said handle or casing, but normally insulated therefrom, and in electric connection with opposite terminals of said series of cells, and a suitable connecting device for establishing electrical connection between said handle or casing and an electrode of a desired one of the cells in the series, substantially as described.

3. An electro-therapeutic appliance comprising a tubular metallic handle or casing, a series of galvanic cells contained therein, but insulated therefrom, suitable contact disks or electrodes secured to opposite ends of said handle or casing, but insulated therefrom, and an electrical connection with opposite terminals of said series of cells, and a suitable device for electrically connecting said handle or casing with either terminal of said series of cells, or with an electrode of any desired cell of said series, substantially as described.

4. An electro-therapeutic appliance comprising a tubular metallic handle or casing, a series of galvanic cells contained therein but insulated therefrom, one or more metallic plates interposed between adjacent cells of the series, suitable contact disks or electrodes secured to opposite ends of said handle or casing, but insulated therefrom, and in electrical connection with opposite terminals of said series of cells, said handle or casing, said intermediate plates or disks, and said contact electrodes being provided with apertures or passages and a contact screw or plug adapted for removable engagement with a desired one of said apertures or passages, substantially as described.

5. An electro-therapeutic appliance comprising a tubular handle or casing A, the insulating buttons B B', the disks or electrodes C C', having extensions passing through said insulating buttons and terminating in metallic contact pieces H and H' upon the inner ends of said insulating buttons, said electrodes being further provided with apertures for detachable engagement with the shanks of removable electrodes K, a series of galvanic cells located within said handle or casing but insulated therefrom, and a suitable device for establishing electrical connection between said handle or casing and a desired one of said electrodes or terminals, substantially as described.

6. An electro-therapeutic appliance comprising a tubular handle or casing A, the insulating buttons B', the disks or electrodes C C', having extensions passing through said insulating buttons and terminating in metallic contact pieces H and H' upon the inner ends of said insulating buttons, said electrodes being further provided with apertures for detachable engagement with the shanks of removable electrodes K, a series of galvanic cells located within said handle or casing but insulated therefrom, disks or plates J J interposed between certain of said cells, and provided with screw-threaded apertures arranged to register with corresponding apertures in said handle or casing, said insulating buttons B B' and contact pieces H H' being similarly provided with screw-threaded apertures or passages registering with apertures in the ends of said handle or casing, and a connecting screw adapted for removable engagement with a desired one of said screw-threaded apertures, whereby either terminal of the series of cells or a desired one of the disks or plates J J may be electrically connected with said handle or casing, substantially as described.

7. An electro-therapeutic appliance comprising a tubular metallic handle or casing, a series of galvanic cells located therein but insulated therefrom, a contact electrode secured to one end of said handle or casing but insulated therefrom, and in electrical connection with one terminal of said series of cells, and a suitable connecting device for establishing an electrical connection between said handle or casing and an electrode of any desired one of the cells in said series, substantially as described.

In testimony whereof I sign this specification in the presence of two witnesses.

JOHN E. WILES.

Witnesses:
JACOB KERSCH,
A. C. RIETBROCK.